United States Patent [19]

Heath et al.

[11] Patent Number: 5,189,813
[45] Date of Patent: Mar. 2, 1993

[54] FLUIDIZED BED AND METHOD OF PROCESSING MATERIAL

[75] Inventors: James E. Heath, Burlington, Canada; Scott L. Angell, Blaine, Minn.

[73] Assignee: Samuel Strapping Systems Ltd., Mississauga, Canada

[21] Appl. No.: 658,650

[22] Filed: Feb. 22, 1991

[51] Int. Cl.⁵ ............................................. F26B 17/00
[52] U.S. Cl. ..................................... 34/57 A; 432/58; 34/1 W; 34/39; 34/57 R; 266/103; 110/245
[58] Field of Search ............ 34/10, 57 R, 57 A, 57 B, 34/57 C, 60, 39, 1 W, 1; 266/102, 103; 432/58; 110/245, 347, 263; 422/143; 165/104.16; 122/4 D

[56] References Cited

U.S. PATENT DOCUMENTS

| | | |
|---|---|---|
| 3,404,874 | 10/1968 | Wynne . |
| 3,685,165 | 8/1972 | Devé ............................. 34/57 A |
| 3,861,054 | 1/1975 | Stahl ............................ 34/57 R |
| 4,249,889 | 2/1981 | Kemp ............................ 432/11 |
| 4,475,884 | 10/1984 | Shang et al. .................. 432/58 |
| 4,491,277 | 1/1985 | Bauer et al. ................... 241/5 |
| 4,492,040 | 1/1985 | Jensen et al. .................. 432/58 |
| 4,563,151 | 1/1986 | Vogel ............................ 432/58 |
| 4,604,055 | 8/1986 | MacKenzie ................... 432/58 |
| 4,617,742 | 10/1986 | Brummel ...................... 432/58 |
| 4,700,766 | 10/1987 | Godderidge .................. 164/5 |
| 4,738,615 | 4/1988 | Bailey et al. .................. 110/245 |
| 4,752,061 | 6/1988 | Dalton et al. ................. 266/103 |
| 4,780,966 | 11/1988 | Harding ....................... 34/57 A |
| 4,800,252 | 1/1989 | Steixner ....................... 219/306 |
| 4,818,849 | 4/1989 | Matlen ......................... 219/354 |

FOREIGN PATENT DOCUMENTS

| | | |
|---|---|---|
| 868257 | 4/1971 | Canada . |
| 1193067 | 9/1985 | Canada . |
| 0025818 | 4/1981 | European Pat. Off. . |
| 0122029 | 10/1984 | European Pat. Off. . |
| 1293187 | 10/1972 | United Kingdom . |

Primary Examiner—Henry A. Bennet
Assistant Examiner—Denise L. F. Gromada

[57] ABSTRACT

An improved fluid bed furnace is disclosed which is useful in heat treating products or particles which are to undergo a change due to exposure to high temperatures. The bed is heated by lamps effectively buried in the bed radiating energy to the fluidized particles. In one embodiment, the lamps are protected by a ceramic tube with the lamps heating the tubes which in turn heat the fluid bed.

3 Claims, 3 Drawing Sheets

FLUIDIZED BED AND METHOD OF PROCESSING MATERIAL

BACKGROUND OF THE INVENTION

There are a host of fluidized beds used for heat treating of components or for other treating of products by exposing the products to heat and examples of such structures and process are found in the following patents: U.K. Patent 1 293 187; Bauer et al., U.S. Pat. No. 4,491,277; Godderidge, U.S. Pat. No. 4,700,766; Canadian Patent 868,257; Devé, U.S. Pat. No. 3,685,165; Bailey, U.S. Pat. No. 4,738,615; Vogel, Canadian Patent 1,193,067; European Patent 0 122 029; European Application 0 025 818 and Harding, U.S. Pat. No. 4,780,966.

An example of a fluidized bed heated by infrared radiation is disclosed in U.S. Pat. No. 4,752,061. A further example of heating using infrared technology can be found in Wynne, U.S. Pat. No. 3,404,874 which discloses the concept of enclosing infrared radiation lamps within a quartz tube for use in a vacuum furnace as well as Steixner, U.S. Pat. No. 4,800,252 which discloses the placing of a quartz lamp within a closed quartz tube.

SUMMARY OF THE INVENTION

The present invention relates to an improved fluidized bed, a method of operating the bed to avoid failure of the heating elements used and a method of treating products.

It has been found that the use of infrared radiation lamps either directly in a fluidized bed or indirectly in a fluidized bed protected by a quartz tube passing through the retort of the lamp interior to the quartz tube can operate satisfactorily, however there is the very high potential of failure of the bed if it is not operated and designed in co-operation with efficient fluidizing of the bed.

Typically, in fluidized bed, the sand or other particles of the bed prefer not to be fluidized at all and certainly upon start-up of the bed, there is a certain period of time until full or efficient fluidizing of the bed is accomplished. One of the greatest problems is that jets can occur in the bed. A jet is basically a large cavity through which the air quickly dissipates to the surface of the bed. It has been found that it is important with the heating of fluidized bed using infrared radiation to achieve effective fluidization of the bed along the length of the infrared emitting element as failure to achieve effective fluidization results in a dead zone along the length of the heating element or in close proximity thereto which will quickly heat up to a temperature which can cause extensive damage to the heating element or the quartz tube and often results in the failure of the same. Therefore, applicant has found that efficient and effective fluidization is necessary when heating with infrared radiation and in particular, effective fluidization along the heating elements is important to the life of the heating arrangement.

Applicant has also found that in treating of products having chemicals or coatings that are burned, changed, or dissipated during the heating process, care must be exercised to assure that the chemicals, coatings or by-products do not contaminate the surface of the heating arrangement which preferably is a quartz tube or the quartz IR lamp capable of producing high intensity IR radiation. Such contamination can result in a hot spot on the heating arrangement and eventually burn through.

It has been found that by heating of the lamps prior to introduction of chemicals or products to be treated the likelihood of contamination is reduced. Therefore, effective fluidization at the heating arrangement and bringing the lamps to their operating power range prior to introduction of any elements to be treated has proven particularly effective in resulting in a bed which is efficient while also having an extended life.

BRIEF DESCRIPTION OF THE DRAWINGS

Preferred embodiments of the invention are shown in the drawings herein.

DETAILED DESCRIPTION OF THE PREFERRED EMBODIMENTS

Figure 1:
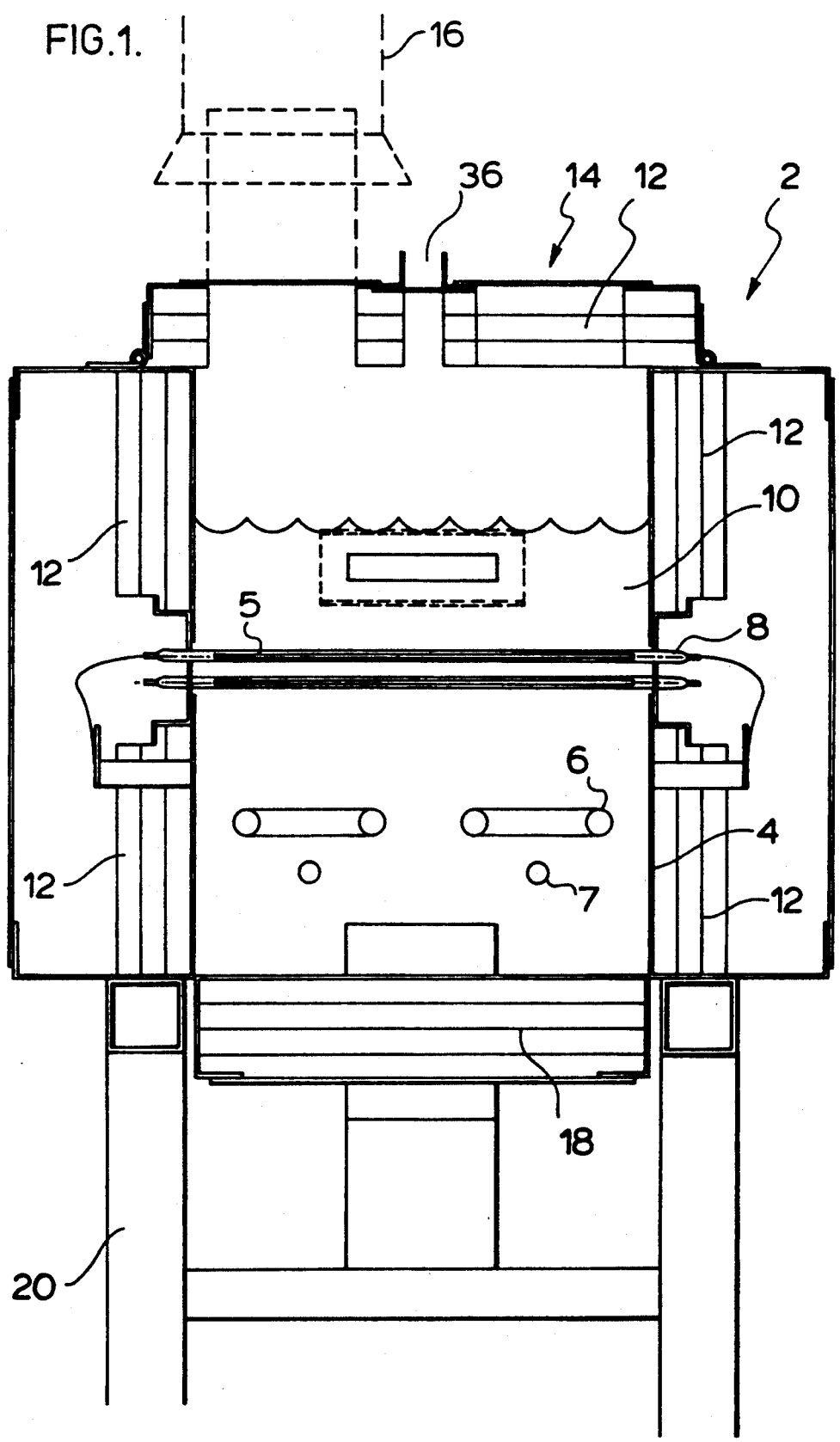
FIG. 1 is a vertical section of the improved fluidized bed.

The fluidized bed 2 shown in the drawings is retained within the retort 4 which is generally of a stainless steel or suitable material. Passing through the side walls of the retort and providing a seal with the side walls is a plurality of infrared radiation lamps generally indicated as 8. These lamps will produce infrared radiation and the actual emitting element is shown as 5. Below the infrared radiation lamps are fluidizing tubes generally shown as 6. The fluidizing tubes are of a continuous circular-like or looped configuration having a plurality of orifices on the lower surface which are sized to provide even fluidization of the bed. Below these tubes is a sparge tube 7 which allows for introduction of some gas below the individual fluidizing tubes and also allows for entry of the fluidizing gas into the bed. The fluidizing particles of the bed are generally shown as 10 and can be sand, aluminum oxide or any other suitable material.

U.S. Pat. No. 4,780,966 which issued to Harding, incorporated herein by reference, discloses a very efficient fluidizing technique and this is the preferred fluidizing technique of the present invention. Other fluidizing techniques can be used, however, what is important is to provide efficient fluidizing of the bed at relatively low air volumes. As one can appreciate, excess air necessary for fluidizing of the bed results in a more violent bed and also results in further heat loss as the air passes out the top surface of the fluidizing bed. In the present case, the air is exhausted through the vent generally shown as 16 in FIG. 2. About the retort 4 is insulation generally shown as 12 which again is placed to maintain heat within the fluidized bed. Bottom insulation generally shown as 18 also serves to insulate the bed and the whole structure is supported on a stand generally indicated as 20.

Using the Harding technology, it has been found that efficient fluidizing can occur at about 2.5 times the minimum air flow required to lift the fluid bed. This level is quite low relative to other arrangements for fluidizing the bed.

Atop the side walls of the fluidizing bed is a hinge top section 14 again having insulation 12 to try to maintain heat in the fluidizing bed.

An access port generally indicated as 36 is provided in the hinge top section 14. Access port 36 will allow a product which is to undergo a change probably a chemical change in the fluidized bed to be introduced to the bed.

It has been found with the fluidizing technique of Harding that the sparge tube generally shown as 7 in the drawings should have approximately 10% of the air exiting therefrom through distributed orifices. The sparge tube has been found particularly useful in providing a gas flow which produces some random turbulence whereby jets or clear space adjacent the fluidizing tube are avoided. Such jetting action is essentially a region in the sand which is clear and allows the air to concentrate and escape through the jet. The addition of the sparge tube and the air emitted therefrom reduces this possibility particularly at start up. This improvement is believed to introduce a random type air turbulence which passes the fluidizing tube 6 after exiting the sparge tube 7 and serves to reduce jetting.

Figure 2:
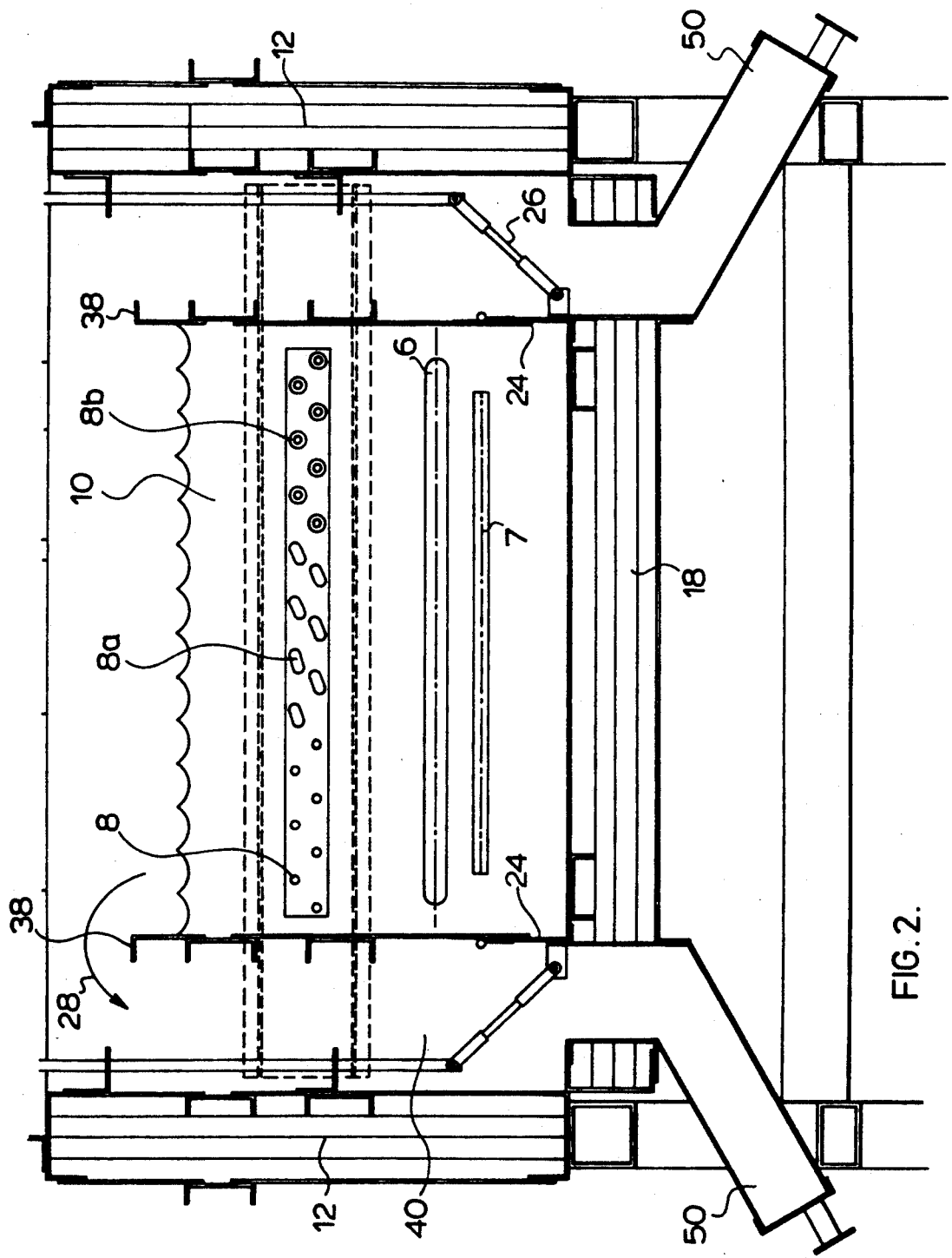
FIG. 2 is a side view of the fluidized bed.
Figure 3:
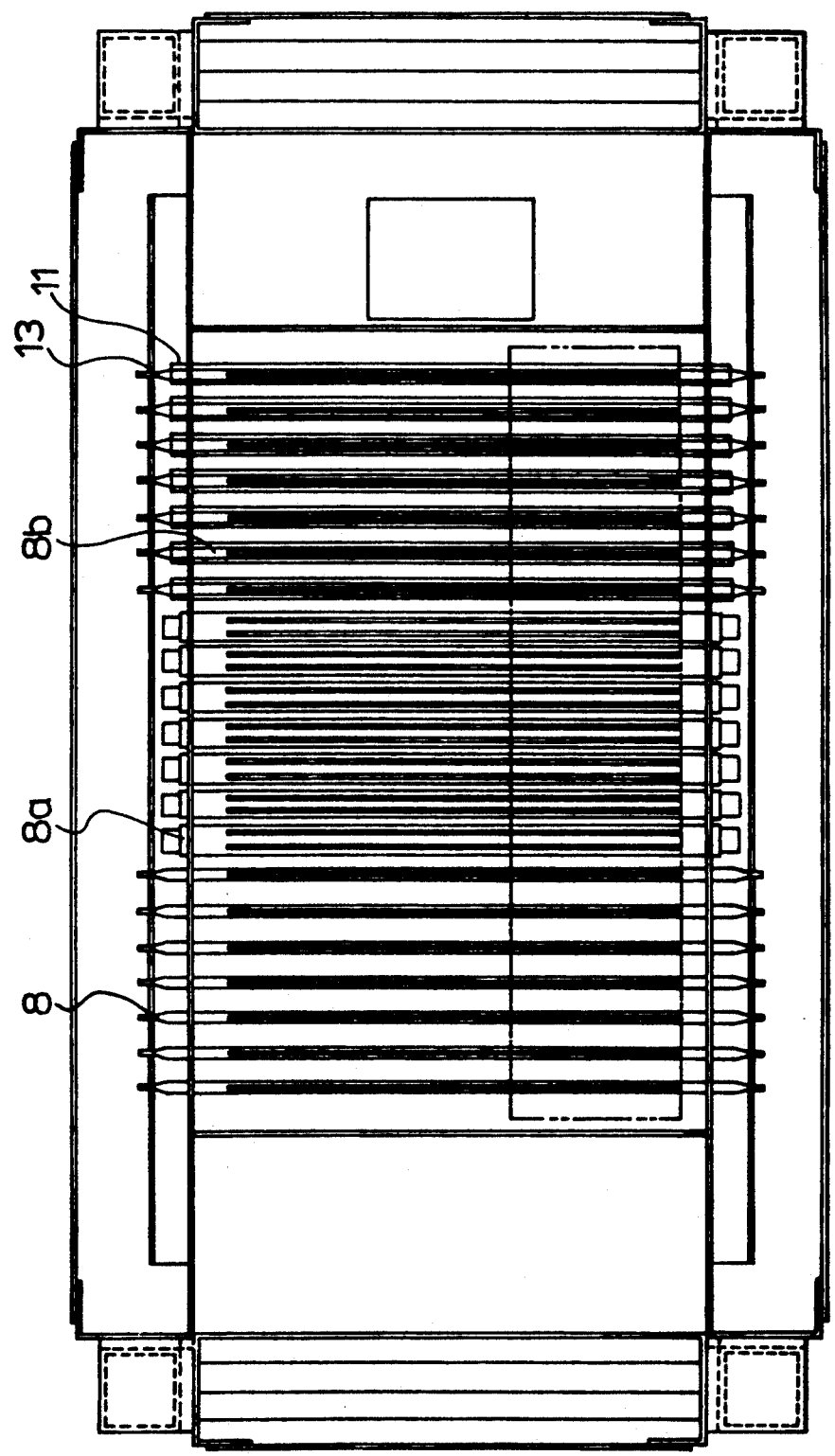
FIG. 3 is a top view of the fluidized bed.

FIG. 2 shows the use of several types of heating arrangements for use in the bed. As can be seen, the quartz tubes are placed above the fluidizing tubes 6 and generally extend across the fluidizing bed. The individual lamps 8, sold by GE, Sylvania, Phillips under product code 1550-T3, are shown directly in contact with the bed and a suitable seal is provided with these lamps at the sides of the retort. Lamps 8A are of a dual element type and are generally sold by LUX THERM under product code 151216. These lamps essentially have their own envelope which is a sealed envelope about the individual heating element. Direct burial of the lamps in the bed improves the efficiency of the unit as the heat of the lamps is absorbed by the bed.

For other applications it is believed advantageous to use a tube arrangement generally shown as 8B in FIG. 2. The tube can be of a quartz material and can house therein the individual infrared radiation lamps. Such an arrangement protects the lamps from the fluidizing particles of the bed and provides easier replacement of the lamps. In actual fact, the replacement of the lamps, even if they are directly buried in the bed, is not that difficult. Replacement is accomplished by means of a follower-type arrangement attached to the lamp with the follower-type arrangement being forced through the bed and out the other side where after the new lamp is properly placed in the bed.

FIG. 2 also shows the fact that the retort has an overflow arrangement generally indicated as 28. During fluidizing of the bed and heating of the bed up to operating temperature where the bed temperature can be up to 1600° to 1800° F. there may be some excess fluidizing material which can spill over the upper edges of the retort indicated as 38. A shoot-type arrangement generally indicated as 40 collects this excess material.

When the bed is used for treating of materials such as foundry sand, the foundry sand is introduced through access port 36 once the lamps have come up to their operating temperature. This foundry sand is only introduced after the lamps are up to operating temperature and after effective fluidization of the bed has been achieved over the area of the lamps where infrared radiation is generated namely 5 in FIG. 1. It has been found that the foundry sand and other products which undergo chemical reactions can go through a stage where they may contaminate the quartz surface of the lamps or quartz tubes or other heating elements and thereby cause a point of contamination which will result in the heating arrangement failing. If contamination is directly deposited on the lamp, then the quartz of the lamp will quickly fail. These problems are avoided by bringing the lamps up to their operating temperature which is generally equivalent to a surface radiating energy in excess of 3000° F. The full fluidization over the lamps avoids the particles to be treated directly contacting the lamps or at least only contacting the lamps or tubes after the particles have been exposed to a substantial temperature.

This has been found to avoid a phase where contamination can occur by quickly passing through it or flashing the material so that it does not go through the stage likely to cause contamination.

It has been found with this arrangement that the foundry sand particles to be reclaimed, which previously would go through a tacky stage and were likely to cause contamination if they are introduced to the bed prior to heating of the lamps and prior to effective fluidization, quickly pass through the tacky stage or avoid the stage completely and do not pose a contamination risk. Depending upon the materials to be treated it can be appreciated that certain care must be exercised in operating the bed. It has been found with the infrared radiation lamps, because of their much higher radiating temperature, i.e., they are equivalent to bodies radiating at 3000° F. or higher as opposed to the bed temperature of only 1600° F., that contamination is not a problem. The direct burial of the lamps in the bed has also improved efficiency of the bed. Any energy is directly brought into contact with the fluid particles or directly radiated to the fluid particles and there is little leakage or loss outside of the bed.

In the continuous treating of sand, once the bed is at the operating temperature, sand may be introduced through the access port 36 at a predetermined rate according to the power of the bed determined by the number of infrared radiation lamps and the power at which they are to be operated. It is generally desired to operate the beds at approximately 80% efficiency as the life of the lamps is greatly increased relative to maximum power output. Therefore, sand which is introduced through access port 36 is eventually discharged by the sand spilling over the upper edge 38 and accumulating or being discharged through the discharge chutes generally shown as 50.

In treating green foundry sand, it is best to operate the bed at a temperature of approximately 1600° F. to 1650° F., whereas no-bake sand can be treated at a temperature of approximately 800° F. to 850° F.

It is believed the exposure of the sand to the high temperature infrared radiation lamps where the energy is transmitted to the sand particles by radiation or through the bed in combination with effective fluidizing of the bed and about the lamps results in a superior processing of the sand compared to conventional methods. The exact rationale for the superior performance is not completely understood. It is theorized that this is the equivalent to reclaiming sand at a much higher temperature close to the radiating temperature of the lamps as opposed to the average temperature of the bed. Possibly, there is very high localized heat treatment being carried out close to the lamp surface as opposed to the lower heat treating going on by the heating of the particles by other particles in areas remote the lamps. Therefore, there may be a very high temperature treating level close to the lamps and a lower treating level as the distance from the lamp increases.

The energy to the lamps is carefully controlled by means of thermalcouples which measure the bed temperature. A controller is used to adjust the input power to the lamps to maintain the proper bed temperature.

The high efficiency of the infrared radiation lamps makes this bed very efficient to operate and this, in combination with the low air requirements of the Harding fluidizing technology results in a clearly superior bed. The advantages of the Harding technology is the low air volume required to achieve effective fluidization. Effective fluidization is required, however, excess air would only remove more heat in the exhaust gas. Although this exhaust gas can be recycled and heat reclaimed therefrom there is always a loss and therefore it is certainly desired to maintain low fluidizing air volume where possible.

The various arrangements for the heating elements, i.e., the direct burying of the tubes shown as 8, the specialized tubes shown as 8B and the use of quartz tubes shown as 8B provides flexibility with respect to the manufacturing of the bed. Although the structure shown as 8B has been described with respect to quartz tube, it is also possible to use high temperature ceramic tubes. In this case, the infrared radiation does not transmit through the ceramic tubes but the ceramic tubes become hot and effectively radiate energy to the bed at a high temperature which can approach the operating temperature of the lamps. Cooling air may be passed through the tubes to provide for some lamp cooling, however, this may not be required. Lamps of this type can generally operate at very high temperatures, however, the ends need to be cooled. In this case, the ends are shown as extending beyond the ceramic tubes out in the air beyond the retort and can be cooled by this air. If necessary, cooling air can be passed over the lamp ends. Even a small air flow over the tubes can increase the life thereof.

The use of the ceramic tubes, which are not transparent to the emitted radiation of the lamps, allows easier replacement of the quartz lamps while also providing a very strong structure and a structure which may be capable of operating at higher fluid bed temperatures. In some cases, oversized ceramic tubes (2 to 4 inches in diameter or greater) can be used to increase the spacing of the lamps from the ceramic tube. This will also increase the air volume and possibly reduce overheating of the lamps. Ceramic tubes and quartz tubes are readily available in 1.5 inch diameter. Ceramic tubes are available from Thermal Ceramics of Georgia and preferably are made of alumina. The ceramic material should be selected to avoid contamination of the lamps when the tube is heated to the operating temperature.

The quartz tubes are known to go through an initial softening stage at approximately 1700° F. and the upper temperature for the bed may be limited by the quartz tube. The ceramic tube should be able to operate to higher temperatures. Although the quartz tends to soften at about 1700° F., the bed should be able to be operated at a higher temperature if good fluidizing is achieved around the heating elements.

Efficient, effective fluidization and preheating of the lamps eliminate many problems in treating materials which otherwise can shorten the life of the equipment and/or reduce the efficiency thereof.

Although preferred embodiments of the invention are described herein in detail, it will be understood by those skilled in the art that variations may be made thereto without departing from the spirit of the invention or the scope of the appended claims.

The embodiments of the invention in which an exclusive property or privilege is claimed are defined as follows:

1. In a fluid bed having a retort and a plurality of lamps which emit energy for heating of the particles of the fluid and means for fluidizing said bed, wherein said lamps are in direct contact with the particles of the fluid bed and said lamps extend through said bed and are submerged within said bed, said fluidizing means effectively fluidizing the particles in said bed to achieve effective fluidizing along at least the portion of each lamp which effectively emits the radiation and avoiding localized overheating or contamination of the lamps.

2. In a fluid bed as claimed in claim 1 wherein said fluidizing means is below said lamps.

3. In a fluid bed as claimed in claim 2 wherein said lamps emit high intensity shortwave infrared radiation.

* * * * *